Jan. 26, 1960 M. A. CLARK ET AL 2,922,843

TWO-WAY TELEVISION OVER TELEPHONE LINES

Filed Aug. 2, 1955 2 Sheets-Sheet 1

INVENTORS MALCOLM A. CLARK
R. L. MILLER
R. W. SEARS

BY Harry C. Hart

ATTORNEY

INVENTORS MALCOLM A. CLARK
R. L. MILLER
R. W. SEARS
BY Harry C. Hart
ATTORNEY

United States Patent Office 2,922,843

Patented Jan. 26, 1960

2,922,843

TWO-WAY TELEVISION OVER TELEPHONE LINES

Malcolm A. Clark, Deep River, Ontario, Canada, and Ralph L. Miller, Chatham, and Raymond W. Sears, West Orange, N.J., assignors to Bell Telephone Laboratories, Incorporated, New York, N.Y., a corporation of New York Application August 2, 1955, Serial No. 525,927

13 Claims. (Cl. 178—6.8)

Figure 1:
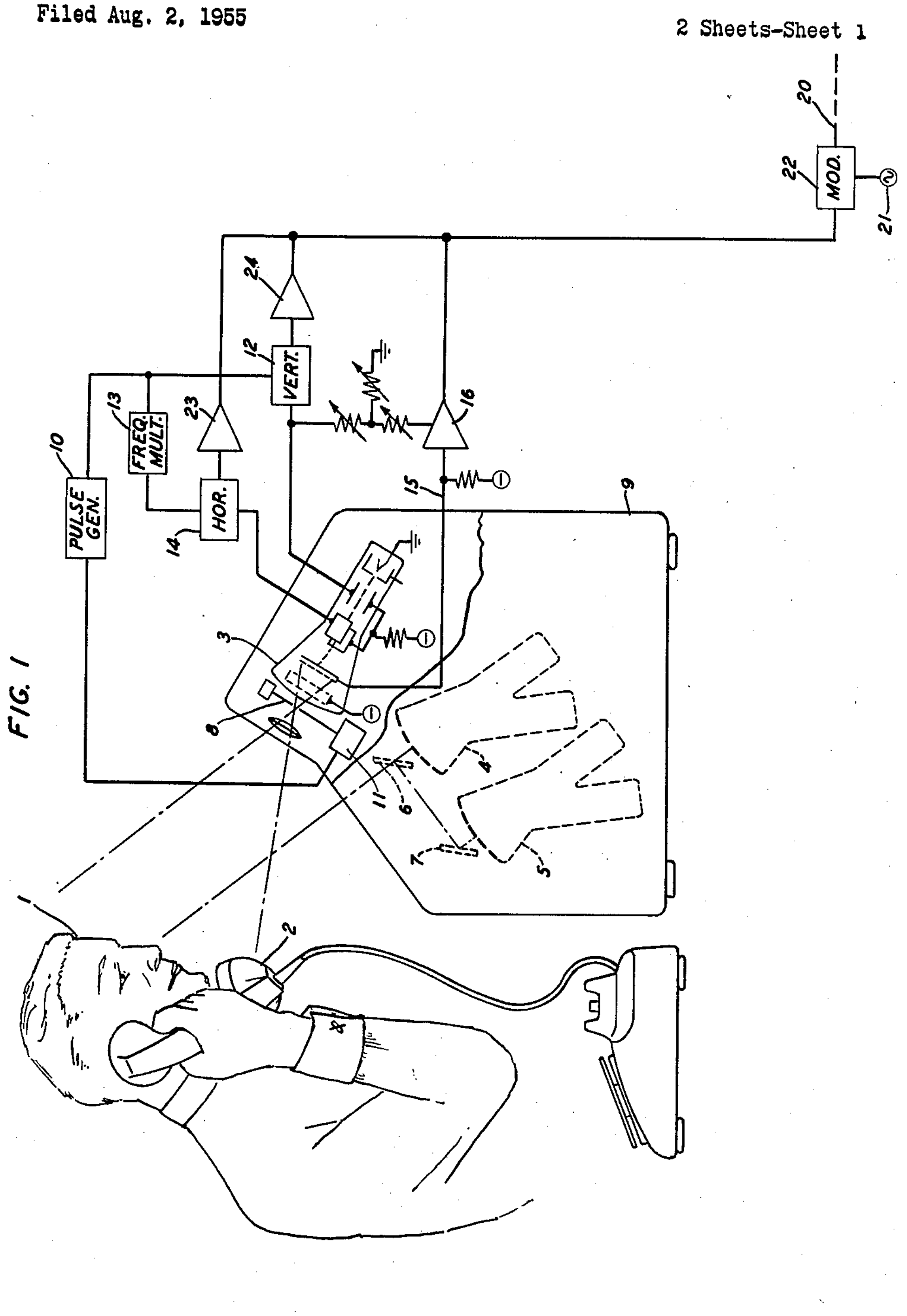

This invention relates to two-way communication service and has for its principal object to provide each subscribing party to such service with simultaneous audible and visual impressions originating with the other party. A related object is to provide such two-way sight and sound communication without making undue frequency bandwidth demands on the transmission medium.

The worldwide development of excellent telephony, i.e., two-way voice communication, which has taken place during the past half century has been rendered possible by the steadfast adherence, on the part of those responsible for the development, to two goals: The determination of the necessary and sufficient frequency band for a telephone channel, and standardization of equipment and techniques in a fashion to provide every subscriber with this standard band. As a consequence of this development, the world, and especially the territory of the United States of America, is covered with a network of telephone lines, each having a bandwidth of approximately 4,000 cycles per second. This necessary and sufficient bandwidth of 4,000 cycles per second represents a judicious compromise between considerations of naturalness of voice reproduction on the one hand which make for greater bandwidth and greater cost, and provision for the continued growth and expansion of the telephone system, which dictate the reduction of bandwidth. The development has also been greatly facilitated by the acceptance of low power levels: sufficient to actuate a transducer which is held to the ear, and no more.

By contrast, the art of image signal transmission has developed along other lines, represented by two divergent tendencies. On the one hand, television has aimed at supplying each receiver with pictures of large size, suitable for simultaneous viewing by a number of persons and in a great amount of detail, represented by wide variations of contrast in the picture, both from point to point at the same time, and from time to time at the same point. These aims can only be attained at the price of very great frequency bandwidth in the transmission medium, so great, indeed that such facilities are out of the question, economically, for a private subscriber, and can be tolerated only by those who simultaneously reach a large number of receivers; i.e., by broadcasters. In other words, television is essentially a one-way communication medium.

The other tendency, typified by the facsimile art, is to force image signals through narrow band transmission channels without sacrifice of the point to point detail. This can be done only at the price of a heavy sacrifice of the time to time detail. Thus the transmission of a picture by facsimile techniques may occupy many minutes. It may even be still in process and not completed when the need for it is past. From the communication standpoint, facsimile is thus comparable with telegraphy; i.e., delivery of the message concurrently with the request for such delivery is impossible.

It is obviously desirable that ordinary two-way voice communication be supplemented by some sort of two-way image signal communication. The slow transmission speed of facsimile and the wide frequency band of television place these techniques beyond consideration.

A copending application of W. E Kock and R. L. Miller, Serial No. 459,300, filed September 30, 1954, and now matured into Patent 2,895,005, granted July 14, 1959, deals with this problem and offers a solution to it. Like the invention of that application, the present invention takes as its starting point the view that the value to the subscribers of any such image signal supplement to their voice communication is roughly equal to the value of the voice communication itself. It takes bandwidth as the best single measure of the price at which such value is purchased and accordingly allots a single entire 4,000 cycle per second bandwidth telephone channel to such image signal. Having established this bandwidth restriction it then sets out to furnish each subscriber, concurrently with the voice of his opposite party, with a picture of his opposite party too, and to establish, within the restrictions imposed by this bandwidth limitation, an optimum compromise between the various considerations which require bandwidth for their transmission, namely picture size, picture contrast variations, and rapidity of picture change.

A picture having the form of a square whose dimensions are approximately 1⅛ inch by ⅞ inch contains about 2,500 picture elements which are at the threshold of resolution of the unaided eye at the distance of most distinct vision. It has been found that such a picture contains an amount of detail which is necessary and sufficient as a voice telephone supplement. It has also been found that the transmission of a fresh picture of this character once each second, which requires, in principle, a band of nominal width 1,250 cycles per second, creates in the viewer a highly satisfactory impression of the viewed party and his movements.

The satisfying character of this impression is in large measure due to the fact that the time through which each picture endures, before giving place to the next one, is longer than the visual retention time of the eye, so that the impression of flicker is avoided, and shorter than the neural retentivity of the brain so that an impression of continuity from each picture to the next is achieved. The selection of this period determines the picture change rate. This rate, together with the available channel bandwidth, determines the number of distinct "elements" which make up the picture; and the holding of these elements at or below the threshold of resolution of the eye determines the size of the picture.

Accordingly the invention provides transmission, from each subscribing party to the other, and over a standard 4,000 cycles per second telephone channel, of pictures of this character, and at this rate.

To actualize such two-way sight and sound communication, the system of the above mentioned Kock-Miller application provides each telephone subscriber, in addition to his telephone set which may be conventional, with a scene pickup device, e.g., a miniature camera tube, and an image forming device, e.g., a miniature picture reproducing tube. These devices are preferably mounted close together and on axes which converge at an intersection point somewhat beyond the distance (10 inches, approximately, for the unaided eye) of most distinct vision, measured from their faces; i.e., at a distance of 20–40 inches. The camera tube generates image signals of what ever scene is within its field of view, in the customary way, and at a rate of, for example, 20 frames per second. A single one of these frames, for example the twentieth, is stored as on a record, the remaining nineteen being discarded. This record is scanned at slow speed, to produce modified image signals, compressed on the frequency scale and expanded on the time scale by a factor of 20:1. The modified signals are transmitted over a standard telephone channel, whose bandwidth is sufficient for the purpose, to a receiver station, where they are recorded on a magnetizable tape at the relatively slow rate at which they arrive. The resulting record is now scanned twenty times in succession and at a high speed: higher, in the ratio of 20:1 than the recording speed, to recover an image signal representing the one undiscarded frame, and restored to its original dimensions in frequency and time. This image signal is applied twenty successive times to the receiving subscriber's reproducer tube to produce on its face twenty successive repetitions of the undiscarded frame. Meantime, the next undiscarded frame signal, similarly derived and similarly transmitted, is recorded at its slow arrival rate on a second magnetizable tape for application in the same fashion to the same reproducer tube. Thus the two tapes accept incoming signals representing successive undiscarded frames in alternation and deliver their records to the reproducer tube in alternation, each tape delivering the record of one undiscarded frame while the other tape is receiving the record of the next undiscarded frame. The receiving subscriber is thus presented with a sequence of physically still pictures, each of which endures for one second and then gives place abruptly to the next. The impression made on the receiving subscriber is one of flickerless, undelayed picture transmission which is concurrent with, and supplements, his voice transmission, while the picture rate of change is such as to create the illusion of almost continuous change in the scene being viewed.

In accordance with the present invention the system is instrumented in a novel fashion. The photosensitive screen of a television pickup device is briefly exposed to the scene to be transmitted at each of a succession of regularly recurrent instants. For example, the exposure may be made once per second and each exposure may endure for one-thirtieth second. The time of each exposure and the interval between each exposure and the next may be controlled by a mechanical shutter or by the application of potentials of appropriate magnitude and polarity to a barrier grid.

Each of these brief exposures results in the storage of an electrostatic image of the scene on the photosensitive screen of the pickup device. This image is now converted into a vision signal by causing an electron beam to scan it in the customary fashion. However, in accordance with the present invention, the scanning takes place much more slowly than is customary in the television art. Thus the speed with which the beam sweeps the image is reduced to such a point that the entire scanning operation requires a full second. As a result the vision signals derived by the scanning process are expanded on the time scale and compressed on the frequency scale by the ration of the number of frames retained; e.g. by a factor of 20:1. The electrostatic image formed on the photosensitive screen by exposure to the scene inevitably decays with the passage of time. While materials are available for which the decay that takes place during one second of time is insignificant, it may be desired to employ materials which decay more rapidly. Decay of the electrostatic image during the period through which it is scanned results in distortion of the resulting vision signal. This distortion may be compensated, in accordance with the invention, by the employment of a variable gain vision signal amplifier, and by increasing its gain gradually from beginning to end of each scan. The control signal which governs this gain increase may conveniently be derived from the timing wave source which governs the vertical sweep of the scanning beam.

The resulting narrow band vision signals are transmitted to a receiver station where they actuate the writing beam of a display tube of the storage type. This operation converts the incoming image signal, derived from a single exposure of the camera tube to the scene, into an electrostatic charge image on the tube storage screen. The tube is provided, in addition, with a flood beam gun and a luminescent screen so arranged that when the storage screen bearing its charge image, is flooded with electrons of the flood beam, a visible image appears on the luminescent screen. All parts of this image appear simultaneously and without resort to any secondary scanning process.

A second similar display tube is provided, and the narrow band vision signals derived from the next exposure of the camera tube to the scene are similarly recorded as a charge image on its storage screen. When a charge image has thus been completely stored it is converted into a visible image as before. Switching means are provided to operate the two display tubes in alternation, each one recording the incoming vision signal, derived from the most recent exposure of the camera tube to the scene, on its storage screen while the other one displays the visible image of the scene derived from the prior exposure. Optical means such as a half transparent mirror are provided to secure space registration of the visible images which are thus caused to appear in succession in the faces of the two display tubes. Thus, by turning to account the storage feature of the display tubes, the present invention dispenses with the magnetizable tapes of the Kock-Miller application. At the same time it takes advantage of the properties of such tubes by arranging that each undiscarded frame, after being slowly built up as an electrostatic image by a scanning process is, immediately the build-up is completed, instantaneously and continuously presented as a steady visible image without flicker and without streaks.

As an alternative, a special tube may be employed having two storage screens, two luminescent screens, a writing beam gun and a flood beam gun or a pair of flood beam guns. The writing beam gun acts to store the image derived from each exposure on one storage screen while the flood beam gun converts the image derived from the prior exposure, and already stored on the second storage screen, into a visible image. Switching means are provided to direct each beam toward one screen while the other beam is directed toward the other screen. Means are also provided for switching the potential of the screen or screen grid so that the writing beam does not generate a visible image and thus interfere with the desired viewing process.

In an ordinary telephone conversation, each party may at any time if he wishes, hear without being heard, as when he wishes to speak to a visitor, merely covering his telephone transmitter with his hand to prevent his voice waves from striking its diaphragm. The present system provides a visual counterpart to this operation, enabling one subscriber to see a picture of the other without himself being seen. This is accomplished by the relative disposition of the pickup device and the reproducer device and by the provision that the subscriber may either view the received picture as it appears on the face of the reproducer tube squarely, in which event his face is within the field of the camera tube, or he may view it obliquely, in which case his face is concealed from the camera tube.

Figure 2:
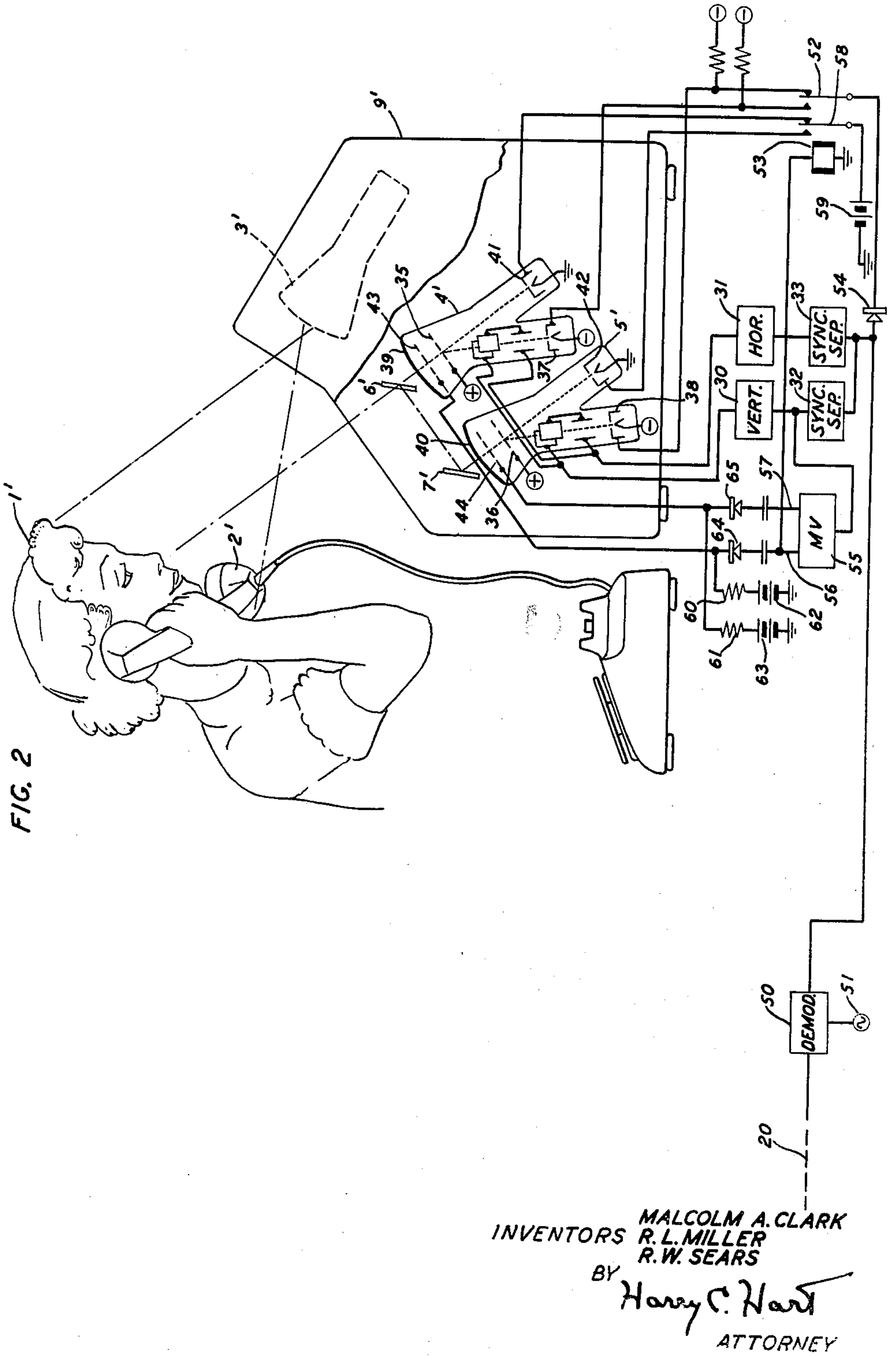

The invention will be fully apprehended from the following detailed description of a preferred illustrative embodiment thereof taken in connection with the appended drawings in which:

Fig. 1 shows transmitter station apparatus in accordance with the invention; and Fig. 2 shows receiver station apparatus in accordance with the invention.

Referring now to the drawings, Fig. 1 and Fig. 2 together show, in block schematic form, a complete system embodying the invention. A west subscriber 1 and an east subscriber 1' are shown engaged in two-way sight and sound communication. While in practice each of them is to be provided with transmitting apparatus and receiving apparatus, the drawings show the west subscriber's transmitting apparatus and the east subscriber's receiving apparatus. Duplication of the receiver apparatus in the west substation and of the transmitter apparatus at the east substation presents no problem, but to show such duplication would tend unduly to complicate the drawing.

Each subscriber is provided with a conventional telephone set 2, 2', including a transmitter and a receiver. Associated telephone apparatus and lines, which may be conventional, are not shown. In the description to follow, receiver apparatus elements shown at the east station, that are the same as the west station sending apparatus elements, are denoted by like reference characters, distinguished by primes.

Each subscriber is provided, further, with a supplementary vision signal set which may comprise a miniature camera tube 3, a pair of miniature reproducer tubes 4, 5, of the storage type, a half transparent mirror 6 and a fully reflecting mirror 7, together with a shutter 8 for exposing the camer tube 3 to the scene and associated apparatus for controlling the intensity and the vertical and horizontal sweeps of the cathode beams of these tubes and for holding the operation of the shutter 8 in synchronism with the sweeping of the beams. The tubes 3, 4, 5 may be mounted in a cabinet 9 having a front face of convenient shape, and they are preferably mounted therein with the mirror 6 spaced not more than a few inches away from the face of one of the reproducer tubes and with the axes of the tubes 3, 4 at angles to each other which intersect at the distance of greatest subscriber convenience, which is normally about two to four times the distance of the most distinct vision. The camera tube 3 is of the image storage type, e.g., of the type which is sold in the market under the name "Iconoscope." The reproducer tubes 4, 5 are likewise of the storage type, e.g., the type sold in the market under the name "Iatron." Many alternatives for camera tubes and reproducer tubes are described in "Television" by Zworkin and Morton (Wiley 1954).

At regular intervals, e.g., once each second, a pulse generator 10 delivers a pulse to a control mechanism 11 which opens the shutter 8 to expose the photosensitive screen of the camera tube 3 to the scene to be transmitted and for a brief interval such as 1/30 second. At the same time it trips a vertical sweep generator 12 which delivers a saw-tooth voltage wave of one second period to control the vertical sweep of the cathode beam of the camera tube. Acting through a frequency multiplier 13, which delivers sixty output pulses for each input pulse applied to it, this generator 10 also trips the horizontal sweep generator 14 which similarly controls the horizontal movement of the cathode beam.

With this arrangement the cathode beam in the camera tube 3 scans the tube face completely, once each second, each scan comprising sixty lateral sweeps. In accordance with the known principles and techniques of the operation of storage type camera tubes, these operations give rise on the output conductor 15 of the camera tube 3 to vision signals. The scanning of the image by the cathode beam acts also to erase it, and so to prepare the photosensitive screen for a new exposure to the scene by the shutter 8. As compared with conventional television signals, these vision signals are slow, narrow band signals. As compared with the system of the aforementioned Kock-Miller application, these signals are derived as slow speed, narrow band signals from the start, and the intermediate record of the Kock-Miller system is dispensed with.

To compensate for any decay of the image stored on the photosensitive screen of the camera tube 3 during the time required for a single complete scan, this vision signal may be passed through a variable gain vision signal amplifier 15, the gain of which is gradually increased from beginning to end of the scan. The control signal which governs this gain increase may conveniently be derived from the vertical sweep generator 12 and may be applied to the gain control terminal of the amplifier 16 by way of a variable resistance network to adjust the magnitude ofthe control wave.

These modified vision signals are now transmitted over a standard telephone line or channel 20 of 4,000 cycles per second bandwidth. The transmission may be carried out by conventional single side band or vestigial side band techniques, for which the bandwidth of the standard channel is ample. To this end a carrier generator 21 and a modulator 22 are shown.

As an alternative to the carrier generator 21, the cathode beam itself may be modulated or chopped at a carrier frequency.

That the modified vision signal occupies no more bandwidth than that of a standard telephone channel will be plain upon recognition that a picture comprising sixty lines, each having sixty picture elements, or a total of 3,600 picture elements, compares favorably, in respect to its quality and detail, with a half-tone reproduction in a magazine or a newspaper, provided only that it be restricted in size. Thus if 3,600 picture elements are distributed over a square picture whose dimensions are one inch by one inch, the picture elements are not individually visible to the unaided eye. By spreading the transmission of these picture elements of a single frame over the entire period of a single second of time the desired transmission can in principle be carried out within a band of 1,800 cycles per second. Thus the provision of a conventional standard telephone channel of 4,000 cycles per second bandwidth, whose phase and amplitude characteristics are suitable at least over the central 2,000 cycle part of its band, is ample for a one inch square picture; indeed, it provides a margin of safety.

To the vision signal record thus formed at the west station there may be added the horizontal and vertical synchronizing signals derived as described above. To this end these signals, in addition to being applied to the camera and reproducer tubes at the west station, are applied by way of buffer amplifiers 23, 24 to the outgoing line 20.

The entire vision signal, modified in the fashion described above, is now transmitted over a conventional telephone channel 20 to an east station for display to an east subscriber. The east subscriber 1' is provided with a conventional telephone instrument 2', a cabinet 9' containing a camera tube 3', a pair of display tubes 4', 5', a half transparent mirror 6' and a fully reflecting mirror 7' through which to view the images on the faces of tubes 4' and 5'. These tubes are supplied with vertical and horizontal beam sweep waves by generators 30, 31 which are locked in step with the transmitted horizontal and vertical synchronizing pulses by synchronizing pulse separators 32, 33. Each of these display tubes 4', 5' is provided with a perforated storage screen 43, 44, a first electron gun 37, 38 for projecting a pencil-like writing beam on the screen 43 or 44, a luminescent screen 39, 40 and a second electron gun 41, 42 for flooding the storage screen 43 or 44 with electrons.

The incoming signal, arriving on the line 20, is first demodulated to remove the carrier by a detector, e.g., a demodulator 50 to which is connected a carrier frequency generator 51. The output of the demodulator 50 is thus a narrow band vision signal like that delivered at the west station to the modulator 22 and containing horizontal and vertical synchronizing pulses. The synchronizing pulses are separated by pulse separators 32, 33 and are applied to horizontal and vertical sweep generators 30, 31 to actuate them.. These generators deliver saw-tooth waves to the horizontal and vertical deflecting elements of the tubes 4', 5' in well known fashion.

The incoming vision signal is applied to one moving contact 52 of a relay 53 whose front and back fixed contacts are connected respectively to the control grids of the writing beam guns 37, 38 of the two tubes 4', 5'. Synchronizing pulses, which are normally of opposite polarity from the vision signals, may be prevented from reaching the contact 52 by a rectifier 54.

Each vertical synchronizing pulse is applied by way of the vertical synchronizing pulse separator 32 to a bistable device such as a multivibrator 55 which, characteristically, has two output terminals 56, 57 and two stable states, the potential of one output terminal shifting from one state to the other each time a pulse is applied to its input terminal, while the potential of the other output terminal shifts at the same instants but in the opposite sense.

One output terminal 56 of this multivibrator is connected to the winding of the relay 53 which actuates the moving contact 52. The sensitivity and the bias, not shown, of this relay 53 are to be so adjusted that for one stable state of the multivibrator 55 the moving contact 52 is drawn against the front fixed contact while for the other stable state it rests against the back fixed contact.

The same relay 53 is provided with another moving contact 58, and another pair of fixed contacts. The moving contact 58 is connected by way of a battery 59 to ground while the front and back fixed contacts are connected, respectively, to the control grids of the flood beam guns 41, 42 of the two tubes 4', 5'. It is important that the connections be so made that when the moving contacts 52, 58 rest against the back contacts in the position shown, the incoming vision signal is applied to the control grid of the writing beam gun 38 of one tube 5' while the potential of the battery 59 is applied to the control grid of the flood beam gun 41 of the other tube, 5', and that when the moving contacts are drawn up against the front fixed contacts of the relay 53 the energization conditions of the two tubes 4', 5' are interchanged.

The vision signal derived from a single particular exposure of the camera tube 3 to the scene, and from which synchronizing pulses have been removed by the rectifier 54, is thus applied to modulate the strength of the writing beam of one of the tubes, for example the left-hand tube 5'. As it does so this beam is caused by the sweep voltages derived from the generators 30, 31 to scan the area of the storage screen 44 and so to build up on this screen an electrostatic charge image of the scene 1' to which the west station camera tube 3 was first exposed. This scanning operation occupies an entire second of time. At the conclusion of this second the potential condition on the first output terminal 56 of the multivibrator 55 is shifted, the relay 53 is actuated, and the moving contacts 52, 58 are drawn against their front fixed contacts. Accordingly, the vision signal corresponding to the following exposure of the camera tube 3 is applied to modulate the writing beam of the other tube 4', while the writing beam of the first tube 5' is disabled by removal of actuating signals from its control element 38. The writing beam of the tube 4' thus scans the storage screen 43 of the tube 4' in the fashion described above for the first exposure and the first tube 5', thereby to build up on the storage screen 43 an electrostatic image of the scene impressed on the camera tube 3 by the second exposure. At the commencement of this scanning operation the moving contact 58 of the relay 53 is also drawn against its front fixed contact, thereby to apply a positive accelerating voltage from the battery 59 to the control element of the flood beam gun 42 of the first tube 5'. The storage screen 44 of the first tube is thus flooded with electrons from its flood beam gun.

Accordingly, the flood beam passes through the various perforations of the storage screen 44 and impinges on the luminescent screen 40 in amounts dependent on the electrostatic charge localized in the immediate vicinity of each such perforation and impressed thereon by the writing beam. This action converts the electrostatic image stored on the screen into a visible image on the luminescent screen 40 which persists until it is erased. Thus the east subscriber 1', viewing the face of the first tube 5', sees a persistent visible image derived at the transmitter station from a single brief exposure of the camera tube 3 to the scene 1.

This image persists as long as the moving contact 58 of the relay engages the front fixed contacts, namely for a full second of time. When this second has elapsed the potential condition of the multivibrator 55 is reversed, the relay 53 is deenergized, the moving contacts 52, 58 return to engage the fixed back contacts, the flood beam of the tube 5' and the writing beam of the tube 4' are disabled, while the flood beam of the tube 4' and the writing beam of the tube 5' are once more enabled. Enabling of the flood beam of the tube 4' operates in the fashion described above to transfer to the luminescent screen 39 of the tube 4' a visible counterpart of the electrostatic image on the storage screen 43 of the tube 4' which was placed there by the scanning of the storage screen 43 by the writing beam, modulated by vision signals corresponding to the second exposure of the camera tube 3 at the west station to the scene. The tube 5' is now in readiness to carry out the storage of an electrostatic charge image of the third exposure.

The visible images which appear on the luminescent screens 39, 40 of the two tubes 4', 5' in alternation for successive exposures of the camera tube to the scene may be brought into space registration or superposed in any desired fashion. For the sake of illustration a half transparent mirror 6' and a fully reflecting mirror 7' are disposed in such positions relatively to the faces of these tubes that the east station subscriber 1' may view the face of one tube 4' by transmitted light and the face of the other tube 5' by reflected light. When this simple means for image registration is employed it is advantageous that no image shall coincide in time with its predecessor image; i.e., that whichever tube is displaying a visible image, the face of the other tube shall be dark. This is automatically accomplished in accordance with the invention since only the one flood beam of the display tube which is being viewed is actuated at a time.

As the last complete scene becomes available for viewing it is placed in service as explained above. The previously stored exposure is now no longer needed and may accordingly be erased to make the area available for storing still later vision signals. To accomplish this an erasing period is provided just prior to the moment at which the writing of the electrostatic image for the following exposure is commenced. To this end the appropriate one of the storage screens 43, 44 is connected by way of a resistor 60, 61 and a positive potential source 62, 63 to ground and is supplied with an erasing pulse once for each full cycle of the operation of the tubes, i.e., once in two seconds, and at the instant of the commencement of the storage operation. To this end each of the two output terminals of the multivibrator 55 is connected by way of a condenser to one of the storage screens. The condenser acts in combination with the load resistor 60 or 61 to form the derivative of the multivibrator output; i.e., to produce a positive-going pulse at the instant of potential rise and a negative-going pulse at the instant of potential fall. Negative-going pulses may be eliminated in any desired fashion, e.g., by the interposition of rectifiers 64, 65. The positive-going pulse applied to the storage screen 43 or 44 acts to discharge it whereupon the previous information on the screen is erased. With this arrangement, regular alternation of the erasing pulses as between the two display tubes 4', 5' is assured.

While the east station apparatus has been illustrated as comprising two separate display tubes, each complete with a writing gun, a flood gun, a storage screen, an erasing screen and a luminescent screen, it is obvious that all of these elements could be included within a single envelope, the storage screens and the luminescent screens being mounted side by side and close together.

This simplifies the registration or superposition in space of their images by optical means. Moreover, it is evident that this construction can be still further simplified by the use of a single writing beam and a single flood beam, one being directed toward one storage screen while the other is directed toward the other storage screen, and each being continuously energized. Modifications of the switching circuits described above to control the beams of such a tube will suggest themselves to those skilled in the art.

What is claimed is:

1. A narrow band image signal transmission system which comprises, at a transmitter station, an image signal generator having a photosensitive storage screen, means for projecting an electron beam onto said screen, and beam deflecting means, a shutter masking said screen, means for periodically opening said shutter for a brief interval in each of a succession of periods to expose said screen to a scene to be transmitted, thereby to form on said screen an electrostatic image of said scene, means including said deflecting means for causing said beam to scan said screen throughout each of said periods to derive, for each such exposure, an image signal, means for transmitting said image to a receiver station, and, at said receiver station, a first and a second image display device, each of said devices comprising a luminescent screen, a storage element, a writing beam gun and an image-converting gun, means including the writing beam gun of said first device for recording an incoming image signal on the storage element of said first device as a space pattern of electric charges, means operative when the recording of said space pattern has been completed for enabling the converting gun of said first device to convert said space pattern into a visible image on the luminescent screen of said first device, similar recording enabling and converting means for said second device, means for applying incoming signals to control said first and second devices in alternation, and optical means for spatially registering visible images appearing on the luminescent screen of said first and second devices.

2. A narrow band image signal transmission system which comprises, at a transmitter station, an image signal generator having a photosensitive storage screen, means for projecting an electron beam toward said screen, and beam deflecting means, a shutter masking said screen, means for periodically opening said shutter for a brief interval in each of a succession of periods to expose said screen to a scene to be transmitted, thereby to form on said screen an electrostatic image of said scene, means including said deflecting means for causing said beam to scan said screen throughout each of said periods to derive, for each such exposure, an image signal, a variable gain amplifier having a gain control terminal, means including said amplifier for transmitting said image signals to a receiver station, means for deriving a control signal from said deflecting means, which signal increases gradually in magnitude throughout each of said periods, and connections for applying said control signal to said gain control terminal, thereby to offset inherent decay of said electrostatic image during said period.

3. Apparatus for reproducing a succession of images from received narrow band image signals which comprises a first and a second image display device, each of said devices comprising a luminescent screen, a storage element, a writing beam gun and an image-converting gun, means including the writing beam gun of said first device for recording said image signals on said storage element as a space pattern of electric charges, means operative when the recording of said space pattern has been completed for enabling the converting gun of said first device to convert said space pattern into a visible image on the luminescent screen of said first device, similar recording, enabling and converting means for said second device, and means for actuating said first and second devices in alternation.

4. In combination with apparatus as defined in claim 3, optical means for spatially registering visible images appearing on the luminescent screens of said first and second devices.

5. Apparatus as defined in claim 3 wherein said actuating means comprises means for applying received image signals to said writing beam guns in alternation, thereby to modulate said writing beams in alternation.

6. Apparatus as defined in claim 5 wherein said converting gun enabling means comprises a source of enabling potential, and means, synchronous with said signal applying means, for applying the potential of said source to the converting beam gun of each of said devices throughout the period during which the received image signals are applied to the writing beam gun of the other device.

7. Apparatus for reproducing a succession of images of a like succession of scenes of a field of view from an incoming image signal wave, each period of which is representative of one of said scenes, which comprises a first and a second image display device, each of said devices comprising a luminescent screen, a storage element, a writing beam gun, an image converting gun and beam deflecting means, means for applying successive periods of said incoming signal wave to said writing beam gun selectively and in alternation thereby to enable said writing beam guns in alternation and to modulate the strength of the writing beams in alternation, a source of sweep voltage, means including said sweep voltage source and said deflecting means for deflecting each of said writing beams, when it is enabled, to scan the area of said storage element, whereby electrostatic space pattern images of said scenes are recorded on said storage elements in alternation, and means, synchronous with said sweep voltage source, for enabling the image converting guns of said devices selectively and in alternation, said enabling means being arranged to enable the converting gun of each of said devices in alternation with the enablement of the writing beam gun of that device, thereby to convert each of said electrostatic space pattern records, when the recording thereof is complete, into a visible image.

8. In combination with apparatus as defined in claim 7, optical means for spatially registering said visible images.

9. Apparatus for reproducing a succession of images from received narrow band image signals which comprises a first and a second image display device, each of said devices comprising a luminescent screen, a planar storage element, a writing beam gun and an image-projecting gun, means for deflecting the writing beam of said writing beam gun to scan the area of the storage element of said first device point by point, means for simultaneously modulating the strength of said writing beam under control of said received image signals, thereby to record said image signals on said storage element as a space pattern of electric charges, means operative when the recording of said space pattern has been completed for enabling the image-projecting gun of said first device to convert said space pattern into a visible image on said luminescent screen, similar deflecting, modulating, and enabling means for said second device, and means for applying said incoming image signals to control said first and second devices in alternation.

10. In combination with apparatus as defined in claim 9, optical means for spatially registering visible images appearing on the luminescent screens of said first and second devices.

11. Apparatus for reproducing a succession of images from received narrow band image signals which comprises a first and a second image display device, each of said devices comprising a luminescent screen, a planar perforated storage element, a first electron gun disposed on one side of said element and adapted to project a sharply focussed writing beam at a first potential onto a selected point of said element, a second electron gun disposed on the same side of said element and adapted to project an unfocussed reading beam at a second potential onto the entire area of said element and a luminescent screen disposed on the opposite side of said element, means for deflecting the writing beam of said first electron gun to scan the area of the storage element of said first device point by point, means for simultaneously modulating the strength of the writing beam of said first device under control of said received image signals, thereby to record said image signals on said storage element as a space pattern of electric charges, means operative when the recording of said space pattern has been completed for disabling the writing beam of said first device and for enabling the reading beam of said first device, thereby to project electrons onto the luminescent screen of said first device in a pattern related to said electric charge space pattern, whereby a visible image appears on the screen of said first device, similar deflecting, modulating, disabling and enabling means for said second device, means for applying said incoming image signals to control said first and second devices in alternation, and optical means for spatially registering visible images appearing on the luminescent screens of said first and second devices.

12. Apparatus for reproducing a succession of images from received narrow band image signals which comprises at least two storage screens, at least one luminescent screen, at least one writing beam gun and at least one image-converting gun, means including a writing beam gun for recording alternate ones of said image signals on one of said storage screens in alternation as space patterns of electric charges, similar means for recording intervening ones of said image signals on the other of said storage screens, and means operative when the recording of each of said space patterns has been completed for enabling an image-converting gun to convert said space pattern into a visible image on a luminescent screen.

13. A narrow band image signal transmission system which comprises, at a transmitter station, an image signal generator having a photosensitive storage screen, means for projecting an electron beam onto said screen, and beam deflecting means, a shutter masking said screen, means for periodically opening said shutter for a brief interval in each of a succession of periods to expose said screen to a scene to be transmitted, thereby to form on said screen an electrostatic image of said scene, means including said deflecting means for causing said beam to scan said screen once in each of said periods to derive, for each such exposure, an image signal, means controlling the speed of said scan to occupy substantially said entire period, means for transmitting said image signals to a receiver station, and, at said receiver station, a first and a second storage element, a first and a second luminescent screen, means for applying said image signals to said storage elements in turn, as separate space patterns, means operative at the conclusion of the storage of each space pattern for displaying a visible image of said space pattern on one of said screens, and optical means for spatially registering said visible images.

References Cited in the file of this patent

UNITED STATES PATENTS

| | | |
|---|---|---|
| 2,179,205 | Toulon | Nov. 7, 1939 |
| 2,250,476 | Evans | July 29, 1941 |
| 2,273,172 | Beers | Feb. 17, 1942 |
| 2,443,634 | Morgan | June 22, 1948 |
| 2,547,215 | Jonker | Apr. 3, 1951 |
| 2,696,523 | Theile | Dec. 7, 1954 |
| 2,714,633 | Fine | Aug. 2, 1955 |
| 2,733,292 | Cope | Jan. 31, 1956 |
| 2,736,767 | Schagen | Feb. 28, 1956 |

FOREIGN PATENTS

| | | |
|---|---|---|
| 812,987 | France | May 21, 1937 |